Patented Feb. 17, 1953

2,628,959

UNITED STATES PATENT OFFICE 2,628,959

PROCESS FOR MAKING STABILIZED DIAZONIUM SALTS

William H. von Glahn, Loudonville, and Herman A. Bergstrom, Delmar, N. Y., assignors to General Aniline & Film Corporation, New York, N. Y., a corporation of Delaware No Drawing. Application November 19, 1949, Serial No. 128,470

8 Claims. (Cl. 260—141)

This invention relates to the preparation of stable diazonium compounds and refers particularly to the production of non-dusting diazonium salts or fast color salts of abnormal grain or particle size which can be used effectively as dye intermediates. This application is a continuation in part of our copending application Serial No. 56,047, filed October 22, 1948, for stabilized diazonium salts and process of effecting same.

In the preparation of diazonium salts, the diazo compound, as produced by diazotization of a primary amine, is generally stabilized by forming a complex double salt of the diazonium chloride with particular inorganic salts capable of forming complex double salts, particularly the chlorides of zinc, tin, cadmium and manganese, and to a lesser degree the chlorides of mercury, iron, antimony, platinum, gold, copper and arsenic. Borohydrofluoric acid and sodium fluoroborate are also extensively used to form these complex double salts with diazonium compounds. In some cases where the stability of the diazonium compound is somewhat greater than usual, the diazo compounds may be stabilized as diazonium chlorides and sulfates. Certain organic sulfonic acids are sometimes used, such as naphthalene sulfonic acids, particularly naphthalene-1,5-disulfonic acid and naphthalene-1,3,6-trisulfonic acid. These stabilized diazonium compounds are known technically as fast color salts (Saunders, "The Aromatic Diazo Compounds," page 29, London 1936). In many cases the fast color salts formed by reaction with one of the above salt formers or stabilizers, have fine grain crystals which filter very poorly due to the small particle size and result in a large proportion of water being retained in the filter cake. This necessitates excessive heat drying. Such heat drying introduces a safety hazard due to possible decomposition of the fast color salts. This is eliminated if the fast color salts are produced initially in a sufficiently dry manner to require only dry-mixing rather than heat drying.

It has now been found that improved stabilized diazonium compounds may be obtained by first reacting the diazotization product with a surface active agent in order to effect a partial stabilization of the diazonium compound with the said surface active agent and then completing the stabilization by precipitation of the fast color salt. This is accomplished by precipitating out as the chloride or sulfate in the case of relatively stable diazonium compounds or by addition of a conventional fast color salt stabilizer such as a metallic salt capable of forming a metallic complex, fluoroborates and aryl sulfonic acids mentioned above. In our co-pending application Serial No. 56,047, we have discussed a number of anionic reactive surface active agents containing an aliphatic hydrophobic and an aliphatically linked hydrophilic group as being suitable for this function.

Another class of surface active agents found to be suitable for this purpose embraces aliphatic acid derivatives of N-dialkyl ethylene diamine having the formula $$RCONHC_2H_4N(R_1)_2$$

wherein R is a long chain hydrocarbon radical of an aliphatic acid having from 12 to 18 carbon atoms such as lauric, myristic, palmitic, oleic, linoleic, and stearic acids and $R_1$ is a methyl or ethyl radical. Examples of surface active agents of this class are:

1. N,N-diethyl-N'-oleoylethylenediamine $$C_{17}H_{33}CONHC_2H_4N(C_2H_5)_2$$

2. N,N-diethyl-N'-linoleoylethylenediamine $$C_{17}H_{31}CONHC_2H_4N(C_2H_5)_2$$

3. N,N-dimethyl-N'-lauroylethylenediamine $$C_{11}H_{23}CONHC_2H_4N(CH_3)_2$$

4. N,N-diethyl-N'-stearoylethylenediamine $$C_{17}H_{35}CONHC_2H_4N(C_2H_5)_2$$

5. N,N-dimethyl-N'-palmitoylethylenediamine $$C_{15}H_{31}CONHC_2H_4N(CH_3)_2$$

6. N,N-diethyl-N'-myristoylethylenediamine $$C_{13}H_{27}CONHC_2H_4N(C_2H_5)_2$$

These surface active agents may be used in the form of the free amine or preferably as the water soluble salts of the amine, such as the acetate, sulfate, hydrochloride, phosphate and nitrate. They may be prepared as described in U. S. Patent No. 1,534,525.

The diazonium compounds stabilized by the surface active agent as chloride or sulfate or with the conventional metallic salts, aryl sulfonic acids or borohydrofluoric acid or fluoroborates are prepared by introducing a solution of the surface active agent into the diazotization solution and precipitating out the fast color salt as chloride or sulfate, as by salting out or by mixing the combined diazo solution and surface active agent solution with a solution of the additional conventional stabilizing agent. The exact order of mixing the reactants is not material, although it is preferable to initially mix the diazonium compound and the surface active agent solutions. However, the fast color salt, or conventional stabilizer, can alternatively be added to the diazo solution prior to the surface active agent provided that the diazo solution is kept sufficiently dilute to prevent precipitation of the stabilized diazo compound before the surface active agent has a chance to act on it. Also, a combined solution of the surface active agent and the fast color salt stabilizer may be added to the diazotization solution or solution of the diazonium chloride, or separate solutions of the surface active agent and the fast color salt stabilizer simultaneously may be added to the diazonium compound solution.

Partial stabilization of the diazonium compound is effected with the surface active agent and completed by precipitation as the chloride or sulfate or by addition of the fast color salt stabilizer, such as zinc chloride, and the completely stabilized diazonium double salts precipitated out with a crystal structure which is distinguished from that of the crystal structures of diazonium double salts which are produced by precipitation of the diazonium chlorides with only the usual fast color salt stabilizers, such as zinc chloride. This new crystal structure results either from the formation of larger crystals or a change in the degree of crystal aggregation. In either case, the product can be handled with greater ease and the solutions more efficiently filtered. It is also characteristic of these diazonium complexes containing the surface active agent as partial stabilizer that a greater degree of initial dryness is present in the filter cake.

The partial stabilization of the diazonium salts by means of the surface active agent of this invention results in an appreciable reduction of the water content of the filtered diazonium salt cake. As compared with ordinary fast color salts stabilized with the usual metallic salts and the like, less water is held by the stabilized diazonium salts of this invention than is held by the fast color salts manufactured in usual manner. The comparative ratio of retained water is in the range of 25 to 50% for the conventionally stabilized diazonium salts to 5 to 15% for the diazonium salts containing the surface active agent of this invention. In order to obtain these results, appreciable amounts of the surface active agent are used. Preferably about 5 to 20% of the surface active agent, based on the amount of the diazonium compound, is employed.

Due to the larger crystalline structure or change in crystal aggregates produced by this method, filtration of the salted out diazonium compound is easier and more efficient than when the surface active agent is not used. Hydraulic pressing may be omitted and the product need not be oven dried, thus eliminating the potential hazard of explosion or fire resulting from decomposition of the diazonium compound always present in oven drying.

In order to inhibit decomposition of stabilized diazonium salts during storage, it is necessary that they be kept as dry as possible. This is accomplished generally by admixing with the stabilized diazonium salts anhydrous agents such as anhydrous sodium sulfate, anhydrous magnesium sulfate and partially dehydrated aluminum sulfate. These compounds combine with water to form water of crystallization and thus keep the diazonium salts dry. The less water initially present in the filter cake, the smaller the amount of such dehydrating agent which must be used. In view of the larger crystal structure or changed crystal aggregate formation resulting from the partial stabilization of the diazonium compound with the surface active agent, the filter cake contains only a fraction of the water which would be present in the same diazonium salt stabilized only by the usual complex salt formation obtainable from such compounds as zinc chloride, and hence requires smaller amounts of dehydrating agents. In the case of diazonium complex salts formed only from the conventional fast color salt stabilizers, such as the zinc chloride mentioned above, it is generally necessary not only to hydraulically press the filter cakes, but also to pre-dry them in ovens heated to approximately 40° C. for from 12 hours to 2 days in order to bring down the water content. Only after such rigorous drying treatment can they be dry mixed with the dehydrating agents. In view of the low water content of the filter cake obtained in the case of the diazonium complex salts partially stabilized with the surface active agent of this invention, this rigorous drying treatment is unnecessary. Hence, dry mixing of the dehydrating agents can be effected immediately after pressing the filter cake and the danger of partial decomposition of the diazo compound due to exposure to excessive heat for long periods of time is averted.

The following examples will serve to more fully illustrate this invention. Unless otherwise stated, the parts are by weight.

*Example 1*

Mix 45 g. of the base produced by diazotizing o-toluidine and coupling with o-toluidine, which compound has the formula

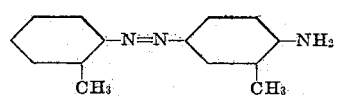

with 500 cc. water. After agitating for ½ hour, 60 g. hydrochloric acid (21° Bé.) are added. After mixing well for an additional ½ hour the mixture is cooled to 0° C. and diazotized by slow addition of 14 g. sodium nitrite as a 30% solution, care being taken that the temperature does not rise above 10° C. Excess nitrite (as determined by starch-iodide paper) is maintained for 10–20 minutes. The solution is treated with charcoal and filtered. To this solution is added 20 g. N,N-diethyl-N'-oleoylethylenediamine, preferably in the form of a water soluble salt, followed by addition of 150 g. 30% sulfuric acid. The stabilized diazo is precipitated out by addition of 80 g. sodium sulfate over a period of 3 hours. The stabilized diazo forms long needles which filter rapidly and have low moisture content after filtering. The stabilized diazo is dry mixed and standardized with sodium sulfate, aluminum sulfate and calcined magnesium sulfate.

Due to the large crystals formed, the filter cake retains very little moisture (6–12% as compared with a usual 40–50% water) and can be readily dry mixed and standardized directly without hydraulic pressing and/or pre-drying in an oven which eliminates one or two operations, and the danger of decomposition during the heat-drying process. A product is obtained which is more stable on storage due to the elimination of the oven-drying step.

The base produced by diazotizing m-toluidine and coupling with m-toluidine, having the formula

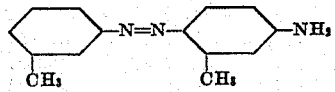

may be substituted for the base used in this example to obtain similar results. The surface active agent of this example may be substituted by N,N-dimethyl-N'-lauroylethylenediamine acetate with equivalent results.

*Example 2*

342 cc. water, 43 cc. hydrochloric acid (21° Bé.) and 30 g. 4'-amino-2',5'-diethoxybenzanilide of the formula

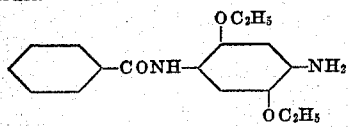

are mixed together and cooled to 5° C. To this is added 7 g. sodium nitrite as a 30% solution. An excess nitrite test is maintained for 30 minutes with starch-iodide paper. The diazo solution is clarified by treatment with diatomaceous earth. 10 g. of the surface active agent N,N-diethyl-N'-stearoylethylenediamine acetate are mixed with the clarified solution, followed by addition of 7 g. zinc chloride dissolved in 21 cc. water. The resulting crystals are filtered and then dry mixed and standardized with sodium sulfate, calcined magnesium sulfate, and anhydrous aluminum sulfate.

The crystals are larger than those formed by treatment with zinc chloride in the absence of the surface active agent and have a lower water content, thus necessitating the use of less of the calcined magnesium sulfate and anhydrous aluminum sulfate. The storage stability is likewise better.

Similar results are obtained if the surface active agent N,N-diethyl-N'-oleoylethylenediamine acetate is used in place of the surface active agent of this example.

*Example 3*

38 cc. of water, 25 cc. hydrochloric acid (21° Bé.) and 16.8 g. 4-nitro-o-anisidine are mixed together and cooled to 0° C. 7 g. sodium nitrite as a 30% solution are added. Excess nitrite is maintained for 30 minutes as determined by the use of starch-iodide paper. The diazo solution is clarified by treatment with diatomaceous earth followed by addition of 10 g. of N,N-diethyl-N'-oleoylethylenediamine acetate. The stabilization is completed by running the diazo solution into a cold solution of 29 g. 1,5-napthalenedisulfonic acid in 30 cc. water. On cooling to 0° C., crystallization ocurs. The crystals are filtered, sucked dry and standardized and dry mixed as in the previous example.

The addition of N,N-diethyl-N'-oleoylethylenediamine acetate results in the formation of larger crystals and in less water content of the filtered cake. Improved storage stability of the stabilized diazo salt is obtained as in the case of Examples 1 and 2. N, N-dimethylpalmitoylethylenediamine acetate may be used as the surface active agent in place of the one used in this example.

*Example 4*

20 cc. water and 15.2 g. 5-nitro-o-toluidine are mixed to form a smooth paste. 34 cc. hydrochloric acid (21° Bé.) are added and the mixture cooled to —10° C. 30 g. ice are added and then 7 g. sodium nitrite as a 30% solution. An excess nitrite test is maintained for 15 minutes as determined by starch-iodide paper. The diazo solution is clarified by treatment with diatomaceous earth. To this solution is added 10 g. N, N-diethyl-N'-oleoylethylenediamine acetate followerd by slow addition of 9 g. borohydrofluoric acid. The crystals are filtered, sucked dry, standardized and dry mixed with anhydrous aluminum sulfate, sodium sulfate and 1,3,6-naphthalene-trisulfonic acid sodium salt. Crystal size was altered by use of the N,N-diethyl-N'-oleoylethylenediamine acetate, which latter may be replaced by N,N-diethyl-N'-myristoylethylenediamine acetate with the same result.

*Example 5*

580 cc. water and 40 g. N-(p-methoxyphenyl)-p-phenylenediamine sulfate are agitated for a few minutes. 86 cc. hydrochloric acid (21° Bé.) are added, the mixture cooled to 5° C. and diazotized by addition of 7 g. sodium nitrite as a 12% solution. Excess nitrite is maintained for 30 minutes by test with starch-iodide paper. It is clarified at about 45° C. with diatomaceous earth. 10 g. N,N-diethyl-N'-oleoylethylenediamine acetate are added to the diazo solution. 220 g. sodium chloride are added over a period of 2 hours while slowly cooling to 25° C. The mixture is cooled to 5° C., filtered, sucked dry and dry mixed and standardized with sodium sulfate, calcined magnesium sulfate, and anhydrous aluminum sulfate.

Larger crystals are formed than when the N,N-diethyl-N'-oleoylethylenediamine acetate is omitted and less moisture is present, thus lessening the amounts of dry mixing agents required and increasing the stability on storage.

When the fast color salts such as the common diazonium chloride-$ZnCl_2$ double salt are manufactured in the usual way without application of any surface active agents, a high percentage of acidified water remains in the crystals. This is eliminated by heat drying with or without dry mixing. If the acid content is sufficiently high, the dyeings are weak and off shade and it is, therefore, necessary to reduce the acid content by addition of MgO or $MgCO_3$ as neutralizing agents. While these agents neutralize the acid satisfactorily they tend to destroy the stability of the diazonium salt and result in the production of dull and weak dyeings upon subsequent conversion to azo dyes. By reducing the water content of the crystals and with it the acid content in accordance with this invention, as illustrated by the foregoing examples, it becomes unnecessary to add MgO or $MgCO_3$ or other neutralizing agents. The resultant improved stability of the diazonium salt is manifested in the bright dyeings obtained on coupling to form azo dyes.

We claim:

1. In a process for the preparation of a stable diazonium salt in solid form which involves precipitation of a diazonium salt from aqueous solution with a fast color salt stabilizer, the improvement which comprises adding to the solution of the diazonium salt, prior to said precipitation, a surface active agent having the formula

wherein R is a long chain hydrocarbon radical of an aliphatic acid having from 12 to 18 carbon atoms and $R_1$ is a member of the group consisting of methyl and ethyl radicals and, said surface-active agent effecting partial stabilization of the diazonium salt, and effecting the aforesaid precipitation of the stable diazonium salt in solid form in the presence of said surface-active agent.

2. In a process for the preparation of a stable diazonium salt in solid form which involves precipitation of a diazonium salt from aqueous solution with a fast color salt stabilizer, the improvement which comprises adding to the solution of the diazonium salt, prior to said precipitation, a surface active agent having the formula $$RCONHC_2H_4N(R_1)_2$$

wherein R is a long chain hydrocarbon radical of an aliphatic acid having from 12 to 18 carbon atoms and $R_1$ is a member of the group consisting of methyl and ethyl radicals, said surface-active agent effecting partial stabilization of the diazonium salt, and effecting the aforesaid precipitation of the stable diazonium salt in solid form with borohydrofluoric acid in the presence of said surface-active agent.

3. In a process for the preparation of a stable diazonium salt in solid form which involves precipitation of a diazonium salt from aqueous solution with a fast color salt stabilizer, the improvement which comprises adding to the solution of the diazonium salt, prior to said precipitation, a surface active agent having the formula $$RCONHC_2H_4N(R_1)_2$$

wherein R is a long chain hydrocarbon radical of an aliphatic acid having from 12 to 18 carbon atoms and $R_1$ is a member of the group consisting of methyl and ethyl radicals said surface-active agent effecting partial stabilization of the diazonium salt, and effecting the aforesaid precipitation of the stable diazonium salt in solid form with zinc chloride in the presence of said surface-active agent.

4. In a process for the preparation of a stable diazonium salt in solid form which involves precipitation of a diazonium salt from aqueous solution with a fast color salt stabilizer, the improvement which comprises adding to the solution of the diazonium salt, prior to said precipitation, a surface active agent having the formula $$RCONHC_2H_4N(R_1)_2$$

wherein R is a long chain hydrocarbon radical of an aliphatic acid having from 12 to 18 carbon atoms and $R_1$ is a member of the group consisting of methyl and ethyl radicals said surface-active agent effecting partial stabilization of the diazonium salt, and effecting the aforesaid precipitation of the stable diazonium salt in solid form with 1,5-naphthalene-disulfonic acid in the presence of said surface-active agent.

5. In a process for the preparation of a stable diazonium salt in solid form which involves precipitation of a diazonium salt from aqueous solution with a fast color salt stabilizer, the improvement which comprises adding to the solution of the diazonium salt, prior to said precipitation, a surface active agent having the formula $$RCONHC_2H_4N(R_1)_2$$

wherein R is a long chain hydrocarbon radical of an aliphatic acid having from 12 to 18 carbon atoms and $R_1$ is a member of the group consisting of methyl and ethyl radicals, said surface-active agent effecting partial stabilization of the diazonium salt, and effecting the aforesaid precipitation of the stable diazonium salt in solid form in the presence of said surface-active agent, the said surface active agent being added in an amount equal to from 5 to 20% of the amount of the diazonium salt.

6. In a process for the preparation of a stable diazonium salt in solid form which involves precipitation of a diazonium salt from aqueous solution with a fast color salt stabilizer, the improvement which comprises adding to the solution of the diazonium salt, prior to said precipitation, the surface-active agent N,N-diethyl-N'-oleoylethylenediamine acetate said surface-active agent effecting partial stabilization of the diazonium salt, and effecting the aforesaid precipitation of the stable diazonium salt in solid form with zinc chloride in the presence of said surface-active agent.

7. In a process for the preparation of a stable diazonium salt in solid form which involves precipitation of a diazonium salt from aqueous solution with a fast color salt stabilizer, the improvement which comprises adding to the solution of the diazonium salt, prior to said precipitation, the surface active agent N,N-diethyl-N'-oleoylethylenediamine acetate, said surface-active agent effecting partial stabilization of the diazonium salt, and effecting the aforesaid precipitation of the stable diazonium salt in solid form with borohydrofluoric acid in the presence of said surface-active agent.

8. In a process for the preparation of a stable diazonium salt in solid form which involves precipitation of a diazonium salt from aqueous solution with a fast color salt stabilizer, the improvement which comprises adding to the solution of the diazonium salt, prior to said precipitation, the surface active agent N,N-diethyl-N'-oleoylethylenediamine acetate said surface-active agent effecting partial stabilization of the diazonium salt, and effecting the aforesaid precipitation of the stable diazonium salt in solid form with 1,5-naphthalene-disulfonic acid in the presence of said surface-active agent.

WILLIAM H. von GLAHN.
HERMAN A. BERGSTROM.

REFERENCES CITED

The following references are of record in the file of this patent:

UNITED STATES PATENTS

| Number | Name | Date |
|---|---|---|
| 2,062,873 | Flett | Dec. 1, 1936 |
| 2,477,165 | Bergstrom | July 26, 1949 |

FOREIGN PATENTS

| Number | Country | Date |
|---|---|---|
| 439,560 | Great Britain | 1936 |